Patented May 15, 1945

2,376,205

UNITED STATES PATENT OFFICE 2,376,205

PROCESS FOR PRODUCING OLEFINIC COMPOUNDS

Miller W. Swaney, Cranford, and Leland K. Beach, Elizabeth, N. J., assignors, by mesne assignments, to Jasco, Incorporated, a corporation of Louisiana No Drawing. Application December 26, 1940, Serial No. 371,826

11 Claims. (Cl. 260—680)

The present invention relates to a process for the production of unsaturated compounds by the dehydrohalogenation of halogenated hydrocarbons. In particular, the invention is concerned with the production of aliphatic diolefins by the dehydrohalogenation of dihaloparaffins and more particularly, to the production of butadiene from dichlorobutane.

The thermal decomposition of dihaloparaffins to yield the corresponding diolefin and hydrogen halide is known to the art. However, the process is so replete with manipulative difficulties that it has never come into general use. The thermal decomposition of the dihalides of paraffin hydrocarbons occurs at such an elevated temperature that the choice of materials capable of retaining their tensile strength at such temperatures with which to make the reactor is exceedingly limited. Also, the hydrogen halide liberated during the reaction is highly reactive at the high temperature, corroding metal reactors and forming salts which are volatile at that temperature, but which condense in the cooler portion of the reactor forming an obstruction which soon stops the flow of material. Furthermore, the hydrocarbons formed during the reaction tend to further decompose, forming a large amount of lower molecular weight hydrocarbons, and ultimately hydrogen and carbon. The products of this secondary decomposition not only dilute or contaminate the desired substance formed, thus yielding an undesirable product, but reduce the yield based upon the halogenated hydrocarbon charge.

In general, the procedure is to vaporize the halohydrocarbon and pass the vapors through a reactor tube heated to a temperature of from 500° C. to 700° C., and to pass the gases leaving the reactor through a recovery system where the unsaturated product is separated from the gases by removal of hydrogen halide followed by condensation. The desired product is then recovered from the condensate by distillation and condensation.

The following examples are illustrative of the deficiencies present in the prior art processes:

EXAMPLE 1

A sample of 2,3-dichlorobutane (B. P. 114–118° C.) was vaporized and passed through an electrically heated 1" inside diameter fused quartz reaction tube maintained at a temperature of 600° C., at such a rate that the reaction time of contact was 1-2 seconds. Under these conditions 75 to 80% of the dichlorobutane was thermally decomposed. The gases leaving the reactor were passed over a cooling surface into a water scrubber to remove hydrogen chloride by absorption, and to condense monochlorobutenes and unreacted dichlorobutane; the gases then passing through a drying tower and into a dry ice-cooled receiver to condense butadiene and other $C_4$ hydrocarbons. The condensates were fractionated taking overhead a $C_4$ cut, namely, that fraction boiling between —10° and +10° C., amounting to a 62% yield based upon the dichlorobutane feed which, upon analysis, showed a 90% butadiene content, the remainder of the condensate being butylenes. Accompanying this run was the formation of considerable light-ends gases and considerable sooty carbon formed in the reaction tube.

EXAMPLE 2

A sample of 2,3-dichlorobutane feed stock was vaporized and passed through a heated 1" inside diameter nickel tube at 600° C. and about 3 seconds contact time. Carbonization was so severe that the reaction tube was nearly plugged after a short time, 32.3 mol per cent of the feed stock being recovered in the form of carbon. Large amounts of light-ends were produced and the $C_4$ cut obtained by fractionating the crude product contained only 50% butadiene, the remainder being principally butylenes.

EXAMPLE 3

A quantity of 2,3-dichlorobutane feed stock was vaporized and passed through a 1" inside diameter copper tube heated to 600° C., a reaction time of contact of 2 seconds being maintained. During this run some light-ends were produced along with 0.1 mol per cent of carbonization occurring in the reaction tube. The butadiene content of the $C_4$ cut was 90%.

EXAMPLE 4

Feed stock of 2,3-dichlorobutane was vaporized and passed through a steel alloy tube (12% chromium, remainder iron) heated to 600° C., the reaction time of contact being held at 2 seconds. An appreciable quantity of light-ends was formed during the experiment and the amount of feed converted to carbon in the reaction tube was approximately 0.1 mol per cent. The purity of the $C_4$ cut was 75% butadiene, the remainder being largely butylenes.

EXAMPLE 5

Feed stock of 2,3-dichlorobutane was vaporized and passed through a steel alloy tube (17% chromium, remainder iron) heated to 600° C., the contact time of the reaction being maintained at 1.2 seconds. Appreciable light-ends were formed along with 0.1 mol per cent of carbon in the tube. The purity of the C₄ cut was 86% butadiene, the remainder being largely butylenes.

EXAMPLE 6

A sample of feed stock of 2,3-dichlorobutane was vaporized and passed through a reaction tube composed of 28% chromium, a trace of nickel, and the remainder iron. The reaction tube was heated to 600° C. and the reaction time of contact was 4 seconds. Some light-ends were produced during the run, and the amount of feed converted to carbon in the tube was 0.1 mol per cent. The purity of the C₄ cut was only 82% butadiene.

According to the present invention, in the dehydrohalogenation of halogenated hydrocarbons, such as the conversion of mono, di, tri or higher halogenated aliphatic or cyclo aliphatic hydrocarbons to olefins, mono-halogenated olefins, diolefins and halogenated diolefins, e. g., monochlorobutane or pentane to butylene and pentylene respectively; dichlorobutane or pentane to butadiene and pentadienes; trichlorobutane to dichlorobutylene or chlorobutadiene, etc., carbonization and the production of undesirable low molecular weight hydrocarbons are substantially avoided and products substantially pure are obtained by conducting the reaction under suitable conditions of time of contact and temperature in a reactor constructed of a noble metal such as platinum or silver, etc.

Thus, aliphatic dienes such as butadiene, pentadienes, hexadienes, etc., are produced from the corresponding dihalides of the saturated aliphatic hydrocarbons such as dichloro or dibromo butane, dichlor or dibromo pentane, etc. by passing the vaporized dihalides thru a heated reaction tube formed from a noble metal at a temperature from about 400° to 700° C., and suitable contact time, condensing the resulting gases and purifying the diene by fractionation. The reaction may be carried out at various pressures ranging from subatmospheric pressures in the order of 100 mm. of Hg to superatmospheric pressures of 1000 mm. of Hg or higher.

It is not necessary to use a reactor having solid walls of noble metal. A reaction tube consisting of an "Inconel" or other alloy metal outer shell lined with an inner lining of noble metal of from 0.001 to 0.010 inch in thickness is quite satisfactory.

The following examples are given for the purpose of illustrating the invention:

EXAMPLE 7

Feed stock of 2,3-dichlorobutane was vaporized and passed through a reaction tube consisting of an Inconel outer shell lined with a 0.003 inch thickness of platinum. The tube was maintained at a temperature of 600° C. and the feed rate employed gave a reaction contact time of 1-2 seconds. The reaction products were separated as in Example 1 above. During the entire run, no light-ends were formed and no carbonization occurred. After the run was completed the inside of the reaction tube possessed a mirror-like finish. The C₄ cut analyzed 97% 1,3-butadiene.

EXAMPLE 8

A sample of 2,3-dichlorobutane feed stock was vaporized and passed at constant rate through a reaction tube heated to 600°-650° C. The reaction tube consisted of an Inconel outer shell equipped with a silver liner about 1/32 inch in thickness. During the run substantially no light-ends were formed and inspection of the tube, following the run, showed only a very slight amount of carbonization. The purity of the C₄ cut isolated as in Example 1 was found to be 94.7% 1,3-butadiene.

For the purpose of ready comparison, the following table is included:

TABLE

*Comparative data on platinum versus other tubes in dehydrohalogenation*

| Example No. | Tube material | Temp. of cracking | Contact time | Carbonization | Light ends | Butadiene purity |
|---|---|---|---|---|---|---|
| | | °C. | Seconds | | | Per cent |
| I | Fused quartz | 600 | 1-2 | Considerable | Considerable | 90 |
| II | Nickel | 600 | 3 | 32.3 mol per cent. | Abundant | 50 |
| III | Copper | 600 | 2 | 0.1 mol per cent. | Appreciable | 90 |
| IV | 12% Cr-steel | 600 | 2 | ----do---- | ----do---- | 75 |
| V | 17% Cr-steel | 600 | 1.2 | ----do---- | ----do---- | 86 |
| VI | 28% Cr-steel, trace of Ni | 600 | 4 | ----do---- | ----do---- | 82 |
| VII | Inconel tube lined with 0.003 inch platinum. | 600 | 1-2 | None | None | 97 |
| VIII | Inconel tube lined with silver | 600-650 | 1 | Very slight | ----do---- | 94.7 |

What is claimed is:

1. The process of producing olefinic compounds which comprises passing halogenated hydrocarbon vapors thru a noble metal reactor heated to a temperature between 400° C. and 700° C. and recovering the olefinic compounds from the resulting gases.

2. The process of producing olefinic compounds which comprises passing halogenated hydrocarbon vapors thru a platinum reactor heated to a temperature between 400° C. and 700° C. and recovering the olefinic compounds from the resulting gases.

3. The process of producing olefinic compounds which comprises passing halogenated hydrocarbon vapors thru a silver reactor heated to a temperature between 400° C. and 700° C. and removing the olefinic compounds from the resulting gases.

4. The process of producing diolefins which comprises passing dihaloparaffin vapors thru a noble metal reactor heated to a temperature of 400° C. to 700° C. and recovering the diolefins from the resulting gases.

5. The process of claim 4 in which a platinum reactor is used.

6. The process of claim 4 in which a silver reactor is used.

7. The process of producing butadiene which comprises passing dichlorobutane vapors thru a noble metal reactor heated to a temperature between 500° C. and 700° C. and recovering the butadiene from the resulting gases.

8. A process of claim 7 in which a platinum reactor is used.

9. A process of claim 7 in which a silver reactor is used.

10. The process of producing butadiene which comprises passing dichlorobutane vapors thru a platinum reactor heated to a temperature of 600° C., and isolating the butadiene from the resulting gases.

11. The process of claim 10 in which a platinum lined reactor is used.

MILLER W. SWANEY.
LELAND K. BEACH.